US008467719B2

(12) United States Patent
Mazzara, Jr.

(10) Patent No.: US 8,467,719 B2
(45) Date of Patent: Jun. 18, 2013

(54) METHOD AND SYSTEM FOR THE DELIVERY OF USER REQUESTED PROGRAM CONTENT USING BROADCAST CHANNELS

(75) Inventor: William E. Mazzara, Jr., Drayton Plains, MI (US)

(73) Assignee: General Motors LLC, Detroit, MI (US)

( * ) Notice: Subject to any disclaimer, the term of this patent is extended or adjusted under 35 U.S.C. 154(b) by 887 days.

(21) Appl. No.: 12/201,798

(22) Filed: Aug. 29, 2008

(65) Prior Publication Data

US 2010/0056076 A1 Mar. 4, 2010

(51) Int. Cl.

| | |
|---|---|
| ***H04H 20/74*** | (2008.01) |
| ***H04H 20/71*** | (2008.01) |
| ***H04L 29/06*** | (2006.01) |
| ***H04M 3/00*** | (2006.01) |

(52) U.S. Cl.
USPC ....... 455/3.01; 455/3.02; 455/414.3; 455/418

(58) Field of Classification Search
USPC ................ 455/3.01–3.06, 412.1–414.3, 566, 455/418–420
See application file for complete search history.

(56) References Cited

U.S. PATENT DOCUMENTS 6,628,928 B1 * 9/2003 Crosby et al. .................. 455/77
7,551,888 B2 * 6/2009 Kopra et al. ................ 455/3.05
2002/0035516 A1 * 3/2002 Arima ............................ 705/26
2002/0183059 A1 * 12/2002 Noreen et al. ............... 455/427
2003/0028884 A1 * 2/2003 Swart et al. ..................... 725/51
2003/0105809 A1 * 6/2003 Yoshii et al. .................. 709/203
2004/0039793 A1 * 2/2004 Sugihara ....................... 709/217
2004/0253945 A1 * 12/2004 Janik ............................ 455/419
2005/0215194 A1 * 9/2005 Boling et al. ................ 455/3.02
2006/0184977 A1 * 8/2006 Mueller et al. .................. 725/86
2006/0294561 A1 * 12/2006 Grannan et al. .............. 725/101
2007/0054613 A1 * 3/2007 Matsubara .................. 455/3.01
2008/0200154 A1 * 8/2008 Maharajh et al. .......... 455/414.3
2008/0242280 A1 * 10/2008 Shapiro et al. ............ 455/414.3
2008/0242290 A1 * 10/2008 Bhatia et al. .............. 455/422.1
2008/0248788 A1 * 10/2008 Smith et al. ................ 455/414.3
2009/0029687 A1 * 1/2009 Ramer et al. ............... 455/414.3
2009/0113054 A1 * 4/2009 Guo et al. ..................... 709/226
2009/0156181 A1 * 6/2009 Athsani et al. ............ 455/414.2
2010/0009622 A1 * 1/2010 Chen ........................... 455/3.01
2010/0074345 A1 * 3/2010 Nguyen et al. ............... 375/259

* cited by examiner

*Primary Examiner* — Simon Nguyen
(74) *Attorney, Agent, or Firm* — Leydig, Voit & Mayer, Ltd.

(57) ABSTRACT

Aspects of the disclosure describe a method and system for the delivery and notification of user requested radio content. Aspects include a radio unit that is physically integrated with and is part of a telematics unit and receives user requested content data from a radio control center over a wireless network. The radio unit processes the user requested content data using a user request application. Further, the user requested data includes the scheduled times for one or more items of user requested content. The user request application orders the scheduled times for the one or more items of user requested content chronologically and displays the one or more items of user requested content data on the user display accordingly.

14 Claims, 7 Drawing Sheets

METHOD AND SYSTEM FOR THE DELIVERY OF USER REQUESTED PROGRAM CONTENT USING BROADCAST CHANNELS

FIELD OF THE INVENTION

The present invention relates generally to delivering, and/or notifying a user of, user requested radio content, and in particular to a method and system for the delivery and notification of user requested program content using broadcast channels.

BACKGROUND OF THE INVENTION

Many vehicles have or are modified to include telematics devices, and a number of services are available through such telematics devices. Telematics services include, but are not limited to turn-by-turn directions and other navigation-related services provided in conjunction with the GPS based chipsets and components, airbag deployment notification and other emergency or roadside assistance-related services provided in connection with various crash and or collision sensor interface modules and sensors located throughout the vehicle. Increasingly, telematics services also include “infotainment-related” services where music radio content, Web pages, movies, television programs, videogames and/or other content is downloaded to the telematics unit. For example, one service may be music content may be downloaded content for current or later playback.

However, current systems for providing user requested content fall short of customer expectations, especially when the requested content is radio content. The presently disclosed principles advance the state of the art in this and other regards.

SUMMARY OF THE INVENTION

Aspects of the disclosure describe a method and system for the delivery and notification of user requested radio content. Aspects include a radio unit that is part of a telematics unit and that receives user requested content data from a radio control center over a wireless network. The radio unit processes the user requested content data using a user request application. Further, the user requested data includes the scheduled times for one or more user requested content. The user request application orders the scheduled times for the one or more user requested content chronologically and displays the one or more user requested content data on the user display accordingly.

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
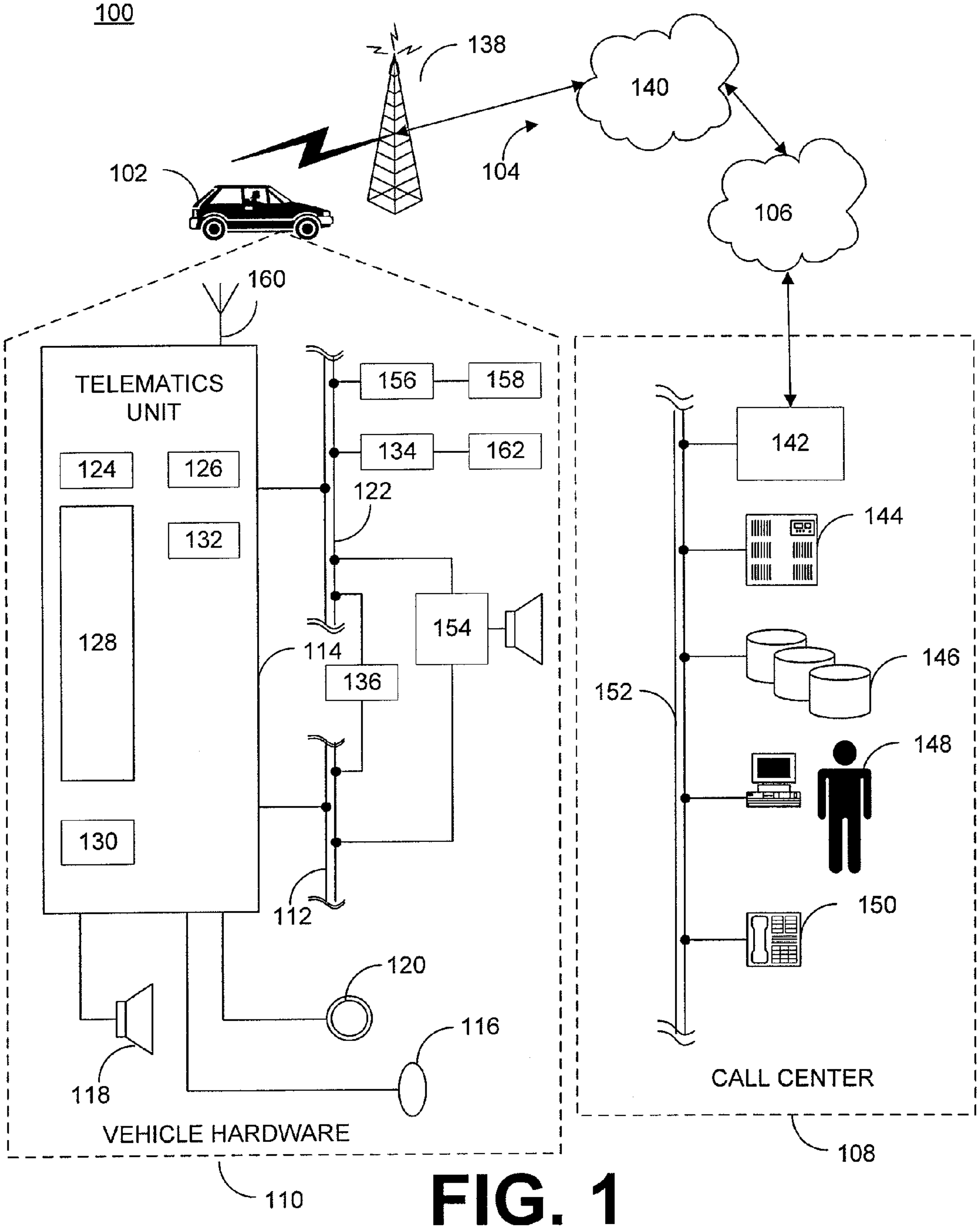
FIG. 1 is a schematic view of an example communication system within which the disclosed system may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various accident and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle accident and/or collision detection sensor interface 156 are operatively connected to the vehicle bus 122. The accident sensors 158 provide information to the telematics unit via the accident and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
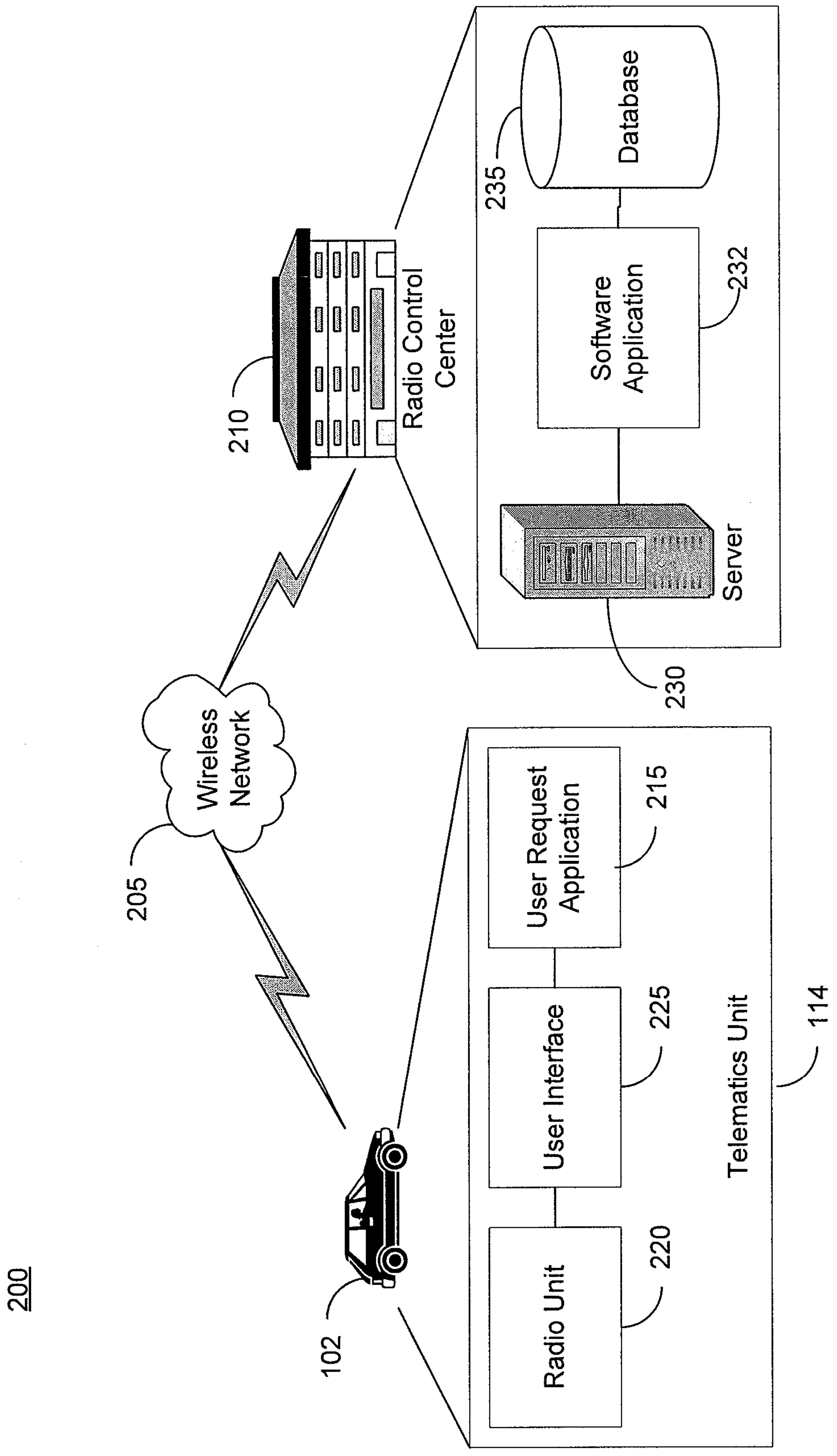
FIG. 2 is a schematic view of an exemplary system architecture in keeping with the disclosed principles.

FIG. 2 is a schematic view of an example system architecture in keeping with the disclosed principles. The vehicle 102 may be installed with a telematics unit 114. A telematics unit user, which may be a vehicle driver, may request radio content from a radio service provider (e.g., local radio station, national radio station, satellite radio provider, etc.). The telematics unit 114 includes a radio unit 220, a user request application 215, and a user interface 225. The radio unit may receive radio signals that contain content and programming including, but not limited to, music, news, sports, talk shows, and other radio content. In addition, the radio unit may include user controls to select radio content from different radio frequencies or radio broadcast channels. Details of the radio unit 220 will be discussed when describing FIG. 5. The user interface 225 allows a user to request radio content from the radio content provider. The user request application 215 receives the user request data from the user interface 225 and sends the user request data to a radio control center 210 across a wireless network 205. The user request data may be the title of the radio content or program or a keyword in the title. The user request application 215 may send the user request data in different data formats that may include, but are not limited to, a Short Message Service (SMS) message, text message, multi-media message, voice message, image message, or instant message. The user request application 215 may be implemented in hardware and software.

The radio control center 210, which is part of the radio content provider, receives the user request data from the user request application 215 across the wireless network 205. The user request data may be stored in an electronic database 235. A software application 232, running on a server 230, analyzes the user request data in conjunction with user request data from other users.

It will be appreciated that the software application discussed herein is implemented in the form of computer-executable instructions recorded on a computer-readable medium, wherein the recorded instructions are executed by a computing device such as the telematics unit. Media that are readable by a computer include both tangible and intangible media. Examples of the former include magnetic discs, optical discs, flash memory, RAM, ROM, tapes, cards, etc. Examples of the latter include acoustic signals, electrical signals, AM and FM waves, etc. As used in the appended claims, the term "computer-readable medium" denotes only tangible media that are readable by a computer unless otherwise specifically noted in the claim.

Details of the software application's operation will be discussed hereinafter with reference to FIG. 4. After performing the prescribed analysis, the software application 232 may send to the user the scheduled time and broadcast channel of the user requested content across the wireless network 205. The user request application 215 may receive this data from the software application 232 running the server 230 residing on the radio content provider's premises. The user request application processes this data and provides information to the radio unit 220 pertaining to the scheduling of the user requested content to display to the user.

Figure 3:
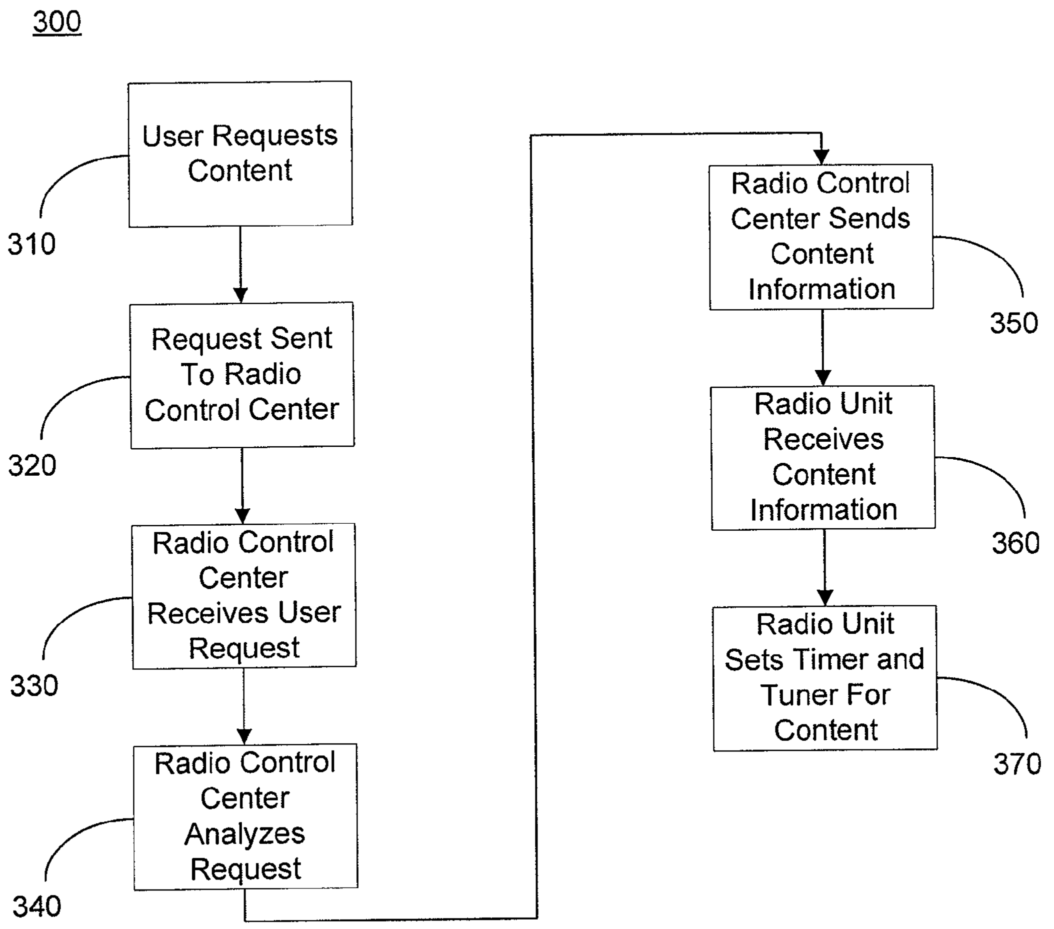
FIGS. 3-4 are flow diagrams that illustrate an exemplary aspect of a method for the delivery and notification of user requested radio content.

FIG. 3 is a flow diagram that illustrates an exemplary aspect of a method for the delivery and notification of user requested radio content. At step 310, the user requests radio content using the user interface of the telematics unit. The user request data may be processed by a user request application as shown in FIG. 2. The processing may include formatting the data in a certain format to send over a wireless network. These data formats may include, but are not limited to, an SMS message, text message, multi-media message, voice message, image message, and instant message. At step 320, the user request data is sent to a radio control center that is part of a radio content provider (e.g. local radio station, national radio station, satellite radio provider, etc.). At step 330, the radio control center receives the user request data and stores it in a database. A software application, running on a server in the radio control center, analyzes the user request data at step 340. Details of this analysis will be discussed when describing FIG. 4. At step 350, the software application, implemented on a radio control center server, sends radio content information to the user across the wireless network. This radio content information includes the scheduling information and the broadcast channel for the requested radio content. At step 360, a radio unit receives the requested content information from the radio control center. At step 370, the radio unit sets a timer and tuner based on the received information and may show the timer and radio content information on a user display.

Figure 4:
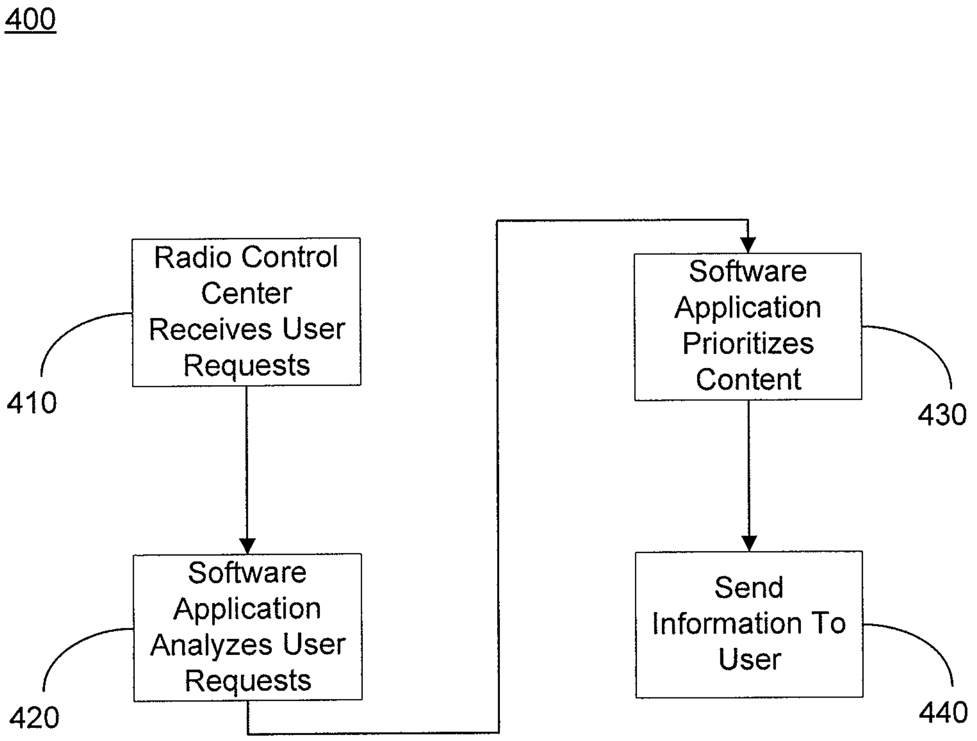

FIG. 4 is further flow diagram that illustrates an aspect of a method for the delivery and notification of user requested radio content. At step 410, the radio control center receives user request data from a plurality of users. At step 420, the software application analyzes each user request in connection with the other user requests. This may include categorizing the user requests based on content type. It may also include counting the number of user requests for a particular radio program. For example, the radio control center may receive and count user requests for a particular song, a football game, and a talk show. At step 430, the software application prioritizes content using several different factors. One factor may be to categorize user requested content into broad categories such as scheduled content and unscheduled content. Scheduled content is radio programming that is already produced and scheduled to be broadcasted by the radio content provider. Examples of scheduled radio content may be sports, news, and talk shows. Unscheduled content is programming that is not scheduled to broadcast by the radio content provider such as a particular song or piece of music.

A radio control center may prioritize scheduled content and unscheduled content in different ways. When receiving user request data for scheduled content, the software application may search and then access the scheduled time and broadcast channel of the scheduled program from a database. It may then send it to each user that requests the particular program. Conversely, when receiving user request data for unscheduled content, such as a particular song, the software application may count the number of requests for the particular song within a time period (e.g. one hour, half hour, etc.) by different users. If the number exceeds a predetermined threshold, then the radio control center may decide to broadcast that song within a certain time period (half hour, one hour, etc.) on a particular broadcast channel. This user-driven content provides a benefit to the radio content provider. Instead of taking the time and expense to schedule particular songs on different broadcast channels, the radio provider utilizes the user request data to schedule the broadcasting of the songs. Further, the radio content provider can designate user request broadcast channels for each genre of music (rock, classical, country, jazz, etc.) that provide added cost savings based on the analysis and prioritization of user requests by the software application. At step 440, the radio control center sends the scheduled time and broadcast channel information to the user.

Figure 5:
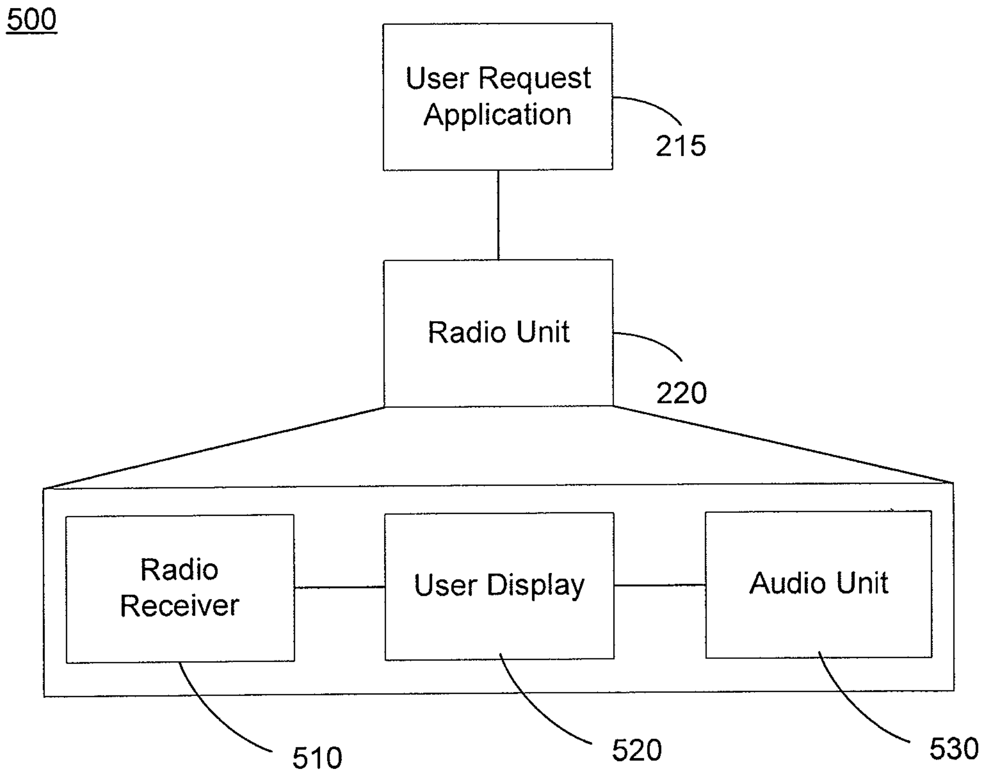
FIG. 5 illustrates a radio unit that is part of an exemplary system and method for delivery and notification of user requested radio content.

FIG. 5 illustrates a radio unit 220 that is part of an exemplary system and method for delivery and notification of user requested radio content. The illustrated radio unit 220 comprises a radio receiver 510, a user display 520 and an audio unit 530. The radio receiver 510 can be tuned to a radio frequency to receive radio signals that carry radio content. The audio unit 530 (e.g., speakers) allows the user to listen to the radio content. A user display 520 receives information from the user request application 215 pertaining to the user requested content and displays it to the user. This includes the scheduled time and the broadcast channel for the requested radio content.

Figure 6:
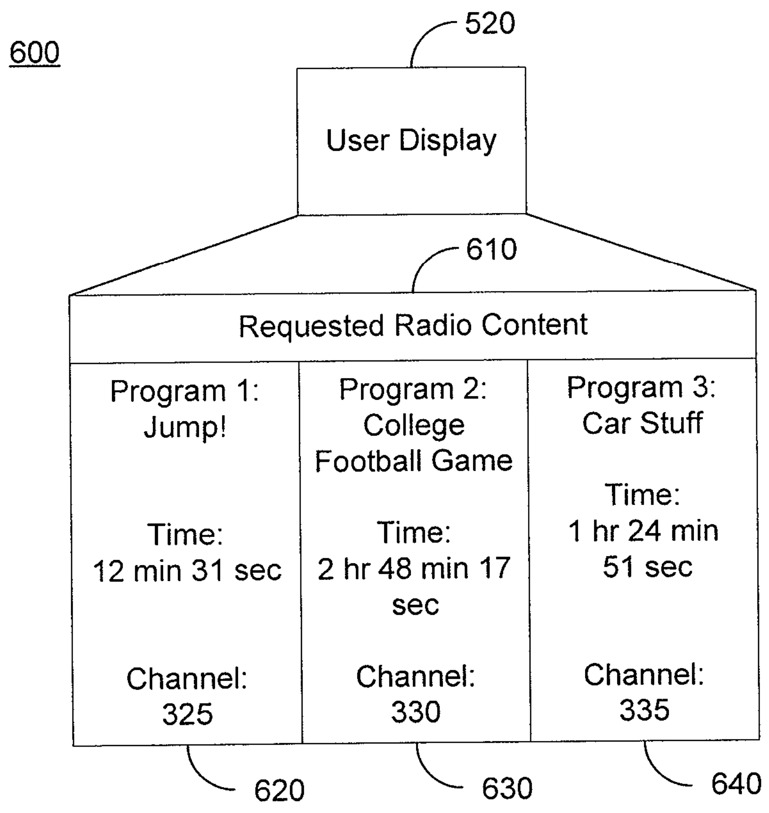
FIG. 6 shows an exemplary user display in accordance with an aspect of the disclosure.

FIG. 6 illustrates an exemplary user display in accordance with one aspect of the disclosed principles. The user display 520 may show user requested content information on a display screen 610. The exemplary display screen 610 shows the title of the requested radio program, the time remaining until the broadcast of the radio program, and the broadcast channel for the radio program. The exemplary display screen 610 shows radio content information for three programs. A first program 620 is a song request called "Jump!" and the radio content provider will broadcast the song in twelve minutes and thirty-one seconds on broadcast channel 325. A second program 630 is a college football game that will be broadcast in two hours forty-eight minutes and seventeen seconds on channel 330. A third program 640 is a car talk show that will be broadcast in one hour and twenty-four minutes and fifty-one seconds on channel 335.

Figure 7:
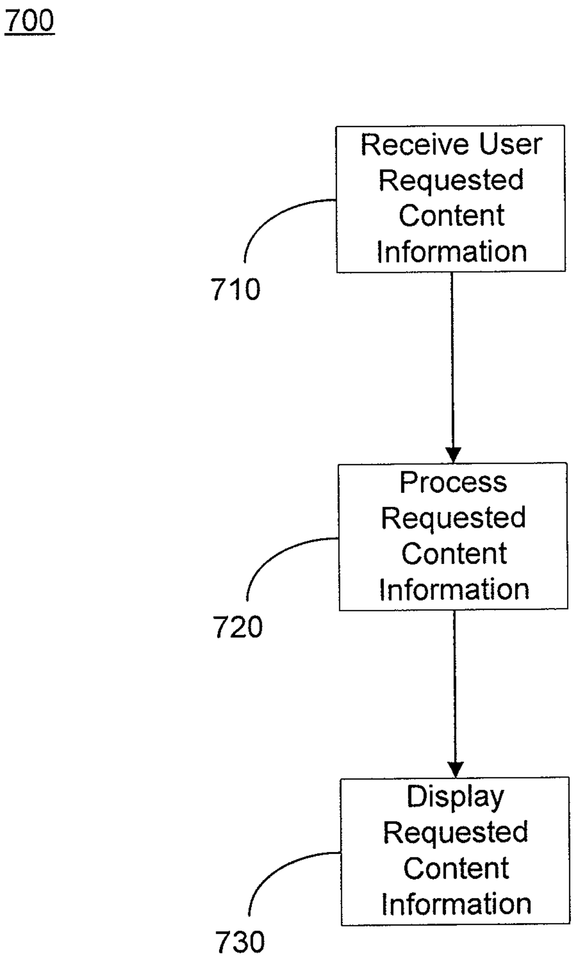
FIG. 7 is further flow diagram illustrating an aspect of a method for the delivery and notification of user requested radio content.

FIG. 7 is another flow diagram that illustrates an exemplary aspect of a method for the delivery and notification of user requested radio content. At step 710, the telematics unit may receive the requested content information from the radio control center. This may implemented by the user request application. At step 720, the user request application processes the requested content information. This may include prioritizing the display of information for different programs based on the scheduled time of each program's broadcast. For example, processing a second program's information may show that it will be broadcast before a first program. Thus, the user request application processes and sends the information pertaining to the second program to a user display before sending the information pertaining to the first program. At step 730, the user request application sends the requested content information to a user display, as part of the radio or telematics unit, to be shown to the user.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Certain implementations are described herein, including the best mode known to the inventors for carrying out the invention. Variations of those implementations may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A method for delivery and notification of user requested radio content, the method comprising:

receiving, by a radio control center, user requests for radio content, the user requests being transmitted to the radio control center over a wireless network and wherein the user requests include user requests for scheduled radio content and user requests for unscheduled radio content;

determining, by the radio control center, that a first user request from a first user is a user request for an item of scheduled radio content, and in response thereto, sending information including a scheduled time and broadcast channel corresponding to the item of scheduled radio content to the first user; and determining, by the radio control center, that a second user request from a second user is a user request for an item of unscheduled radio content and determining that a number of user requests corresponding to the item of unscheduled radio content received within a predefined period of time exceeds a threshold value, wherein the item of unscheduled radio content belongs to a particular category, and in response thereto, scheduling the item of unscheduled radio content for transmission over a particular broadcast channel corresponding to the particular category.

2. The method according to claim 1, wherein the user requests for radio content are a in a data format selected from the group consisting of: an SMS message, text message, multi-media message, voice message, image message, and instant message.

3. The method according to claim 1, wherein the radio content is selected from the group consisting of music, news, sports, and talk.

4. The method of claim 1 further comprising the step of:

issuing, by the radio control center in accordance with the scheduling, a scheduling notification, the notification specifying the identified unscheduled radio content, the particular channel, and a time value indicative of when the unscheduled radio content is to be broadcast on the particular channel.

5. The method of claim 4 wherein the notification is addressed to a user radio unit that submitted a request for the identified unscheduled radio content, and in response, the user radio unit updates a schedule in a non-transitory memory with information from the scheduling notification.

6. A system for delivery and notification of user requested radio content, the system comprising:

a radio control center having a server configured with a processor and a non-transitory computer readable medium having a software application comprising computer-executable instructions that, when executed by the processor, enable the server to process user requests for radio content and schedule broadcasting of unscheduled radio content based upon user requests for the unscheduled radio content; and a database including a schedule for transmitting radio content for a set of broadcast channels, the schedule including, for each broadcast channel, a listing of scheduled radio content entries, each scheduled radio content entry including: a radio content identification, and a scheduled broadcast times for the identified radio content;

wherein the server is configured by the software application such that when the software application is executed by the processor, the server performs the steps of:

receiving user requests for radio content, the user requests being received by the server via a network interface and wherein the user requests include user requests for scheduled radio content and user requests for unscheduled radio content;

determining that a first user request from a first user is a user request for an item of scheduled radio content, and in response thereto, sending information including a scheduled time and broadcast channel corresponding to the item of scheduled radio content to the first user; and determining that a second user request from a second user is a user request for an item of unscheduled radio content and determining that a number of user requests corresponding to the item of unscheduled radio content received within a predefined period of time exceeds a threshold value wherein the item of unscheduled radio content belongs to particular category, and in response thereto, scheduling the item of unscheduled radio content for transmission over a particular broadcast channel corresponding to the particular category.

7. The system according to claim 6 wherein the user requests are received from respective telematics units via a wireless network.

8. The system according to claim 6, wherein the software application executed by the processor to process the one or more user requests is further adapted to receive scheduled times for one or more user requested content; order scheduled times for the one or more user requested content chronologically; and send the scheduled times for the one or more user requested content to the user display.

9. The system according to claim 8, wherein the user display displays the one or more user requested content data in chronological order of the scheduled times for the one or more user requested content data.

10. The system according to claim 6, wherein the user requests for radio content are in a data format selected from the group consisting of: an SMS message, text message, multi-media message, voice message, image message, and instant message.

11. The system according to claim 6, wherein the radio content is selected from the group consisting of music, news, sports, and talk.

12. The system according to claim 6, wherein the wireless network is selected from the group consisting of a wireless wide area network, a wireless metropolitan area network, a wireless local area network, a CDMA2000 network, an Evolution Data Optimized (EVDO) network, a High Speed Downlink Packet Access (HSDPA) network, a GSM network, a WiFi network, and a WiMAX network.

13. The system of claim 6 wherein the radio control center is configured by the application software to perform the further step of:

issuing, in accordance with the scheduling, a scheduling notification, the notification specifying the identified unscheduled radio content, the particular channel, and a time value indicative of when the unscheduled radio content is to be broadcast on the particular channel.

14. The system of claim 13 wherein the notification is addressed to a user radio unit that submitted a request for the identified unscheduled radio content, and in response, the user radio unit updates a schedule in a non-transitory memory with information from the scheduling notification.

* * * * *